Patented Aug. 17, 1954

2,686,792

UNITED STATES PATENT OFFICE 2,686,792

11α-HYDROXY TESTOSTERONES

Herbert C. Murray, Hickory Corners, and Durey H. Peterson, Kalamazoo, Mich., assignors to The Upjohn Company, Kalamazoo, Mich., a corporation of Michigan No Drawing. Application January 15, 1953, Serial No. 331,491

10 Claims. (Cl. 260—397.45)

This invention relates to steroids and more particularly to certain testosterone derivatives namely 11α - hydroxytestosterone, 11α - hydroxy - 10 - normethyltestosterone and their esters represented by the following formula:

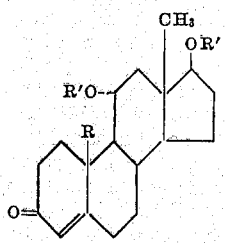

wherein R is hydrogen or methyl and R' is hydrogen or the acid radical of an aliphatic or carbocyclic acid.

It is an object of this invention to provide the novel 11α-hydroxytestosterone, 11α-hydroxy-10-normethyltestosterone and their esters, and a process of preparing the same. Other objects will be apparent to those skilled in the art to which this invention pertains.

As described in the applications of which this is a continuation-in-part, S. N. 296,728, now abandoned, and 296,729, filed July 1, 1952; and 278,122 and 278,123, filed March 22, 1952, now both abandoned, which are continuations-in-part of 272,944, filed February 23, 1952, now Patent 2,602,769, issued July 8, 1952, and 180,496, filed August 19, 1950, now abandoned, the novel compounds of the present invention may be prepared from testosterone or 10-normethyltestosterone by the oxygenating action of a culture of fungus and the resulting oxygenated products may be esterified.

Esterification may be accomplished by admixing 11α-hydroxytestosterone or 11α-hydroxy-10-normethyltestosterone with an acylating agent such as, for example, ketone, a ketene of a selected acid, an acid, acid chloride or acid anhydride, or other known acylating agent, usually in a solvent such as, for example, pyridine or the like, or an inert solvent, including solvents like benzene, toluene, ether, and the like, for example, and heated at a temperature between about zero degrees centigrade and the boiling point of the reaction mixture usually about room temperature, for a period between about a half hour and about 96 hours. The time of reaction as well as the temperature at which the reaction is carried out, the acylating agent, and the ratio of reactants may be varied. The reaction mixture is suitably poured into ice or cold water, the product collected in an appropriate solvent which is thereafter washed with successive portions of a mildly basic solution and water to obtain a solution of the product which is essentially neutral.

In some instances, the product may crystallize from the reaction mixture, in which case it may be advantageous to separate the product by filtration or other means, wash with water, and thereafter purify by conventional means, such as, for example, by recrystallization from a suitable solvent or by chromatographic purification, as deemed necessary.

The thus-described acylation process, and as illustrated in more detail in the examples following in this specification, produces both the mono-esters and the di-esters, although in different proportions, depending upon the proportions of acylating agent to 11α-hydroxytestosterone or 11α-hydroxy - 10 - normethyltestosterone. Using approximately one equivalent of acylating agent to steroid produces predominantly the mono-acylated product, whereas with about two or more equivalents of acylating agent to steroid, the predominant product is the diacylated product.

The following examples are illustrative of the process and products of the present invention, but are not to be construed as limiting.

Example 1.—11α-hydroxytestosterone

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Three liters of this sterilized medium was inoculated with Rhizopus nigricans minus strain, American Type Culture Collection Number 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24-hour growth of Rhizopus nigricans minus strain was added 1.5 grams of testosterone in thirty milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The extractives obtained upon evaporation of the methylene chloride solvent weighed 2.5492 grams.

Partial decolorization of the crude extractives was effected by taking them up with 35 milliliters of methylene chloride, adding three grams of Magnesol synthetic magnesium silicate and filtering. Upon evaporation of the solvent, the residue was taken up in an excess of acetone, mixed with 0.2 gram of Celite No. 545 diatomaceous earth, filtered, and evaporated to dryness. This residue was dissolved in 150 milliliters of benzene and fractionated over 75 grams of alumina (washed with hydrochloric acid and dried at 120 degrees centigrade) with 150-milliliter portions of solvent fractions as in the table.

Table

| Fraction | Solvent | Eluate Solids, Milligrams |
| --- | --- | --- |
| 1,2 | benzene plus 10 percent ether | 55.9 |
| 3,4 | benzene plus 50 percent ether | 74.5 |
| 5-7 | ether | 904.5 |
| 8-10 | ether plus 5 percent chloroform | 191.6 |
| 11,12 | ether plus 10 percent chloroform | 21.5 |
| 13 | do | 2.4 |
| 14-16 | ether plus 50 percent chloroform | 15.0 |
| 17-19 | chloroform | 66.2 |
| 20 | chloroform plus 5 percent acetone | 34.7 |
| 21 | do | 27.5 |
| 22 | do | 30.8 |
| 23-25 | chloroform plus 10 percent acetone | 113.3 |
| 26-28 | chloroform plus 50 percent acetone | 139.7 |
| 29 | acetone | 62.1 |
| 30 | do | 32.4 |
| 31 | do | 16.9 |
| 32 | acetone plus 5 percent methanol | 30.1 |
| 33-41 | acetone-methanol, increased to 100 percent methanol. | 35.3 |
| Total | | 1,854.4 |

Fractions 23 to 30, weighing 378 milligrams, freed of solvent, were dissolved in acetone, concentrated to ten milliliters, filtered to separate a small amount of flocculent precipitate, and evaporated to dryness. The residue was dissolved in fifteen milliliters of ethyl acetate, concentrated over a steam-bath to five milliliters, and cooled to crystallize the product. The crystals (409-SHE-41B-1) were separated by filtration and washed three times with one-milliliter portions of ethyl acetate.

The mother liquor fraction identified as 409-SHE-41B-1 M. L. was combined with subsequently obtained fraction 41B-2 M. L., as described below, and evaporated to crystallization. The crystals were washed with cold ethyl acetate yielding sample 41B-3 weighing 40.5 milligrams and melting at 177 to 178 degrees centigrade.

Crystals 409-SHE-41B-1, obtained concomitantly with the above mother liquor fraction, weighing 319.9 milligrams, were taken up in methylene chloride, Magnesol was added to decolorize, the suspension was filtered and the filtrate was evaporated. The residue was redissolved in two milliliters of ethyl acetate and crystallized therefrom yielding 198.7 milligrams of crystals (409-SHE-41B-2) melting at 179 to 182 degrees centigrade and mother liquor fraction 41B-2 M. L. which mother liquor fraction is utilized as indicated in the preceding paragraph. These crystals were taken up in seven milliliters of ethyl acetate, concentrated to four milliliters and recrystallized, yielding 169.7 milligrams of 11α-hydroxytestosterone, softening at 178 degrees centigrade, melting at 181 to 181.5 degrees centigrade and having an optical rotation $[\alpha]_D^{23}$ of plus 93 degrees (chloroform). Infrared spectrum shows the presence of an additional hydroxyl on testosterone.

*Analysis.*—Calculated for $C_{19}H_{27}O_3$: C, 74.97; H, 9.27. Found: C, 74.69; H, 9.26.

*Example 2A.—11α-hydroxy-10-normethyltestosterone*

A medium was prepared of 0.5 gram of soy flour, two grams of dextrose, and 0.5 gram each of debittered brewer's yeast extract, sodium chloride, and potassium dihydrogen phosphate diluted with tap water to 100 milliliters and adjusted with hydrochloric acid to a pH of 4.5. This sterilized medium was inoculated with spores of *Rhizopus reflexus* ATCC 1225, from a malt agar slant, and incubated for 24 hours at a temperature of 28 degrees centigrade using agitation and aeration corresponding to an oxygen uptake of eight millimoles per hour per liter of $Na_2SO_3$ according to Cooper, Fernstrom and Miller, Ind. Eng. Chem., 36, 504 (1944). To this medium, containing a 24-hour growth of *Rhizopus reflexus,* was added twenty miligrams of 10-normethyltestosterone dissolved in one milliliter of acetone to produce a suspension of the steroid in the culture. After an additional 24-hour period of incubation under the same conditions of temperature and aeration, the beer and mycelium were extracted as in Example 1. The concentrated extract was subjected to separation by paper chromatography using a propylene glycol-toluene system to yield 11α-hydroxy - 10 - normethyltestosterone and 6β-hydroxy-10-normethyltestosterone.

*Example 2B.—11α-hydroxy-10-normethyltestosterone*

Otherwise like Example 2A, similar results were produced by fermentation of *Rhizopus reflexus* in a medium consisting of two grams of corn steep liquor, two grams of dextrin, 0.10 gram of potassium dihydrogen phosphate, 0.2 gram of sodium nitrate, 0.5 gram of magnesium sulfate heptahydrate, 0.02 gram of potassium chloride, 0.001 gram of ferrous sulfate heptahydrate, and 0.25 gram sodium acetate diluted with tap water to 100 milliliters and adjusted with concentrated sodium hydroxide to a pH of 7.0.

*Example 2C.—11α-hydroxy-10-normethyltestosterone*

In the same manner as described in Example 1, 11α-hydroxy-10-normethyltestosterone is prepared from 10-normethyltestosterone [Birch, J. Chem. Soc. (London), 1950, 367] by subjecting the latter steroid to the oxygenating activity of *Rhizopus nigricans* minus strain, American Type Culture Collection Number 6227b. The resulting oxygenated steroid is isolated from the fermentation mixture in the same manner as described in Example 1 and purified 11α-hydroxy-10-normethyltestosterone is obtained by crystallization of the reaction product from ethyl acetate.

*Example 3.—11α-acetoxytestosterone acetate*

To fifty milligrams (0.164 millimole) of 11α- hydroxytestosterone dissolved in one milliliter of barium oxide dried pyridine was added one milliliter (0.452 millimole) of a solution of 0.462 milliliter of redistilled acetic anhydride diluted to ten milliliters with dry pyridine and the reaction mixture maintained at room temperature for sixteen hours. The reaction mixture was then diluted to fifty milliliters and thereafter placed in a refrigerator for 24 hours. The thus-produced crystalline precipitate of 11α-acetoxytestosterone acetate was filtered, washed with four one-milliliter portions of ice water and thereafter dried in vacuum at sixty degree centigrade. The dry product weighed 34 milligrams and melted at 187 to 195 degrees centigrade. Infrared spectrum analysis confirmed the theoretical structure. The product was dissolved in 1.5 milliliters of methanol, the resulting solution filtered and thereafter diluted with 0.5 milliliter of water whereafter there was precipitated crystals which were filtered, washed with three one-milliliter portions of ice water and thereafter dried at seventy degrees centigrade. The 11α-acetoxytestosterone acetate thus - produced weighing 22 milligrams melted at 201 to 203 degrees centigrade and had an $[\alpha]_D^{23}$ of plus 56 degrees (1.087 in chloroform).

Analysis.—Calculated for $C_{23}H_{32}O_5$:
C, 70.92; H, 8.52
Found:
C, 71.19; H, 8.46
C, 71.22; H, 8.36

*Example 4.—11α-formyloxytestosterone formate*

In the same manner as Example 3, 11α-formyloxytestosterone formate is prepared by reacting 11α-hydroxytestosterone with more than about two equivalents of formic acid.

*Example 5.—11α-propionyloxytestosterone propionate*

In the same manner as Example 3, 11α-propionyloxytestosterone propionate is prepared by reacting 11α-hydroxytestosterone with more than about two equivalents of propionic anhydride in pyridine.

*Example 6.—11α-(β-cyclopentyl)propionyloxytestosterone β-cyclopentylpropionate*

In the same manner as Example 3, 11α-(β-cyclopentyl)propionyloxytestosterone β - cyclopentylpropionate is prepared by reacting 11α-hydroxytestosterone with more than about two equivalents of β-cyclopentylpropionyl chloride in pyridine.

*Example 7.—11α-benzoxytestosterone benzoate*

In the same manner as Example 3, 11α-benzoxytestosterone benzoate is prepared by reacting 11α-hydroxytestosterone with more than about two molar equivalents of benzoyl chloride in pyridine.

*Example 8.—11α-acetoxy-10-normethyltestosterone acetate*

In the same manner as Example 3, 11α-acetoxy-10-normethyltestosterone acetate is prepared by reacting 11α-hydroxy-10-normethyltestosterone with more than about two equivalents of acetic anhydride in pyridine.

*Example 9.—11α-formyloxy-10-normethyltestosterone formate*

In the same manner as Example 3, 11α-formyloxy-10-normethyltestosterone formate is prepared by reacting 11α-hydroxy-10-normethyltestosterone with more than about two equivalents of formic acid.

*Example 10.—11α-propionyloxy-10-normethyltestosterone propionate*

In the same manner as Example 3, 11α-propionyloxy-10-normethyltestosterone propionate is prepared by reacting 11α-hydroxy-10-normethyltestosterone with more than about two equivalents of propionic anhydride in pyridine.

*Example 11.—11α - (β - cyclopentyl)propionloxy-10 - normethyltestosterone β - cyclopentylpropionate*

In the same manner as Example 3, 11α-(β-cyclopentyl)propionyloxy - 10 - normethyltestosterone β-cyclopentylpropionate is prepared by reacting 11α - hydroxy - 10 - normethyltestosterone with more than about two equivalents of β-cyclopentylpropionyl chloride in pyridine.

*Example 12.—11α-benzoxy-10-normethyltestosterone benzoate*

In the same manner as Example 3, 11α-benzoxy-10-normethyltestosterone benzoate is prepared by reacting 11α-hydroxy-10-normethyltestosterone with more than about two molar equivalents of benzoyl chloride in pyridine.

In a similar manner, other esters of 11α-hydroxytestosterone and 11α-hydroxy-10-normethyltestosterone are prepared according to acylation procedures, as illustrated above or by reaction with ketene, ketenes of selected acids, selected acids, acid anhydrides, or acid chlorides, in an organic solvent such as pyridine or the like. Representative esters of 11α-hydroxytestosterone and 11α-hydroxy-10-normethyltestosterone thus-prepared include one to eight carbon atom carboxylic acid acyloxy esters of saturated or unsaturated, aliphatic, carbocyclic, or cycloaliphatic, aryl, arylalkyl, alkaryl, mono, di or polycarboxylic acids which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acrylyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like if desired.

The 11α-hydroxytestosterone, 11α-hydroxy-10-normethyltestosterone and their carboxylic acid esters are thermostable. These compounds have pharmacological activity per se and are useful as chemical intermediates for the production of other steroids which possess pharmacological utility. They demonstrate anesthetic and androgenic hormonal properties and function as ultraviolet screens. Saponification of 11α-acyloxytestosterone and oxidation of 11α-hydroxytestosterone is productive of adrenosterone, 4-androstene-3,11,17-trione. Similarly, saponification of 11α - acyloxy - 10 - normethyltestosterone and oxidation of 11α-hydroxy-10-normethyltestosterone with chromium trioxide, $CrO_3$, produce 10-normethyl-4-androstene-3,11,20-trione otherwise identified as 10 - normethyladrenosterone having androgenic hormone activity.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:
1. A compound represented by the graphical formula:

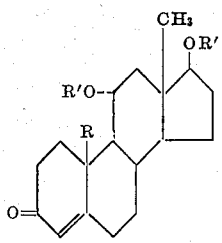

wherein R is selected from the radicals consisting of hydrogen and methyl, and R' is selected from the radicals consisting of hydrogen and hydrocarbon-carboxylic acyl radical containing from one to eight carbon atoms, inclusively.

2. 11α-hydroxytestosterone.
3. 11α-hydroxy-10-normethyltestosterone.
4. 11α-acyloxytestosterone acylate of a hydrocarbon carboxylic acid having less than nine carbon atoms.
5. 11α-acyloxy-10-normethyltestosterone acylate of a hydrocarbon carboxylic acid having less than nine carbon atoms.
6. 11α-acetoxytestosterone acetate.
7. 11α-propionyloxytestosterone propionate.
8. 11α-(β - cyclopentyl) propionyloxytestosterone β-cyclopentylpropionate.
9. 11α-acyloxytestosterone acylate of an aliphatic hydrocarbon carboxylic acid having less than nine carbon atoms.
10. 11α-acyloxytesterone acylate of a hydrocarbon carbocyclic carboxylic acid having less than nine carbon atoms.

No references cited.